United States Patent
Baldi et al.

(10) Patent No.: US 8,843,627 B1
(45) Date of Patent: Sep. 23, 2014

(54) SYSTEM AND METHOD FOR EXTRACTING SIGNATURES FROM SEEDED FLOW GROUPS TO CLASSIFY NETWORK TRAFFIC

(71) Applicant: Narus, Inc., Sunnyvale, CA (US)

(72) Inventors: Mario Baldi, Cuneo (IT); Yong Liao, Sunnyvale, CA (US); Stanislav Miskovic, San Jose, CA (US); Qiang Xu, Hangzhou (CN)

(73) Assignee: Narus, Inc., Sunnyvale, CA (US)

( * ) Notice: Subject to any disclaimer, the term of this patent is extended or adjusted under 35 U.S.C. 154(b) by 179 days.

(21) Appl. No.: 13/694,025

(22) Filed: Oct. 19, 2012

(51) Int. Cl.
*G06F 15/173* (2006.01)
*H04L 12/26* (2006.01)

(52) U.S. Cl.
CPC .................... *H04L 43/04* (2013.01)
USPC ........................................... 709/224

(58) Field of Classification Search
USPC ............. 709/201–203, 217, 223, 224, 227; 706/22, 23
See application file for complete search history.

(56) References Cited

U.S. PATENT DOCUMENTS

| | | | |
|---|---|---|---|
| 6,147,976 A * | 11/2000 | Shand et al. | 370/254 |
| 6,412,000 B1 * | 6/2002 | Riddle et al. | 709/224 |
| 6,457,051 B1 * | 9/2002 | Riddle et al. | 709/224 |
| 7,308,715 B2 * | 12/2007 | Gupta et al. | 726/23 |
| 7,444,515 B2 * | 10/2008 | Dharmapurikar et al. | 713/176 |
| 7,584,507 B1 * | 9/2009 | Nucci | 726/23 |
| 7,712,134 B1 * | 5/2010 | Nucci et al. | 726/23 |
| 7,747,075 B2 * | 6/2010 | Tian | 382/173 |
| 7,944,822 B1 * | 5/2011 | Nucci et al. | 370/229 |
| 8,407,794 B2 * | 3/2013 | Kim et al. | 726/24 |
| 8,571,951 B2 * | 10/2013 | Diana et al. | 705/35 |
| 8,578,024 B1 * | 11/2013 | Keralapura et al. | 709/224 |
| 2003/0108012 A1 * | 6/2003 | Sambhwani et al. | 370/335 |
| 2003/0108042 A1 * | 6/2003 | Skillicorn et al. | 370/389 |
| 2006/0265259 A1 * | 11/2006 | Diana et al. | 705/7 |
| 2007/0030926 A1 * | 2/2007 | Brown et al. | 375/340 |
| 2007/0171827 A1 * | 7/2007 | Scott et al. | 370/235 |
| 2008/0178293 A1 * | 7/2008 | Keen et al. | 726/23 |
| 2008/0262345 A1 * | 10/2008 | Fichtinger et al. | 600/426 |
| 2009/0141634 A1 * | 6/2009 | Rothstein et al. | 370/236 |

* cited by examiner

*Primary Examiner* — Sargon Nano
(74) *Attorney, Agent, or Firm* — Fernandez & Associates, LLP

(57) ABSTRACT

Embodiments of the invention provide a method, system, and computer readable medium for classifying network traffic based on application signatures generated during a training phase. The application signatures are generated using (a) seeding flows obtained from a network trace based on a pre-determined selection criterion, and (b) for each seeding flow, a seeded flow group that is obtained from the network trace based on a pre-determined seeding criterion associated with the seeding flow. Specifically, persistent data patterns frequently occurring across multiple seeded flow groups are analyzed to generate the signatures.

49 Claims, 5 Drawing Sheets

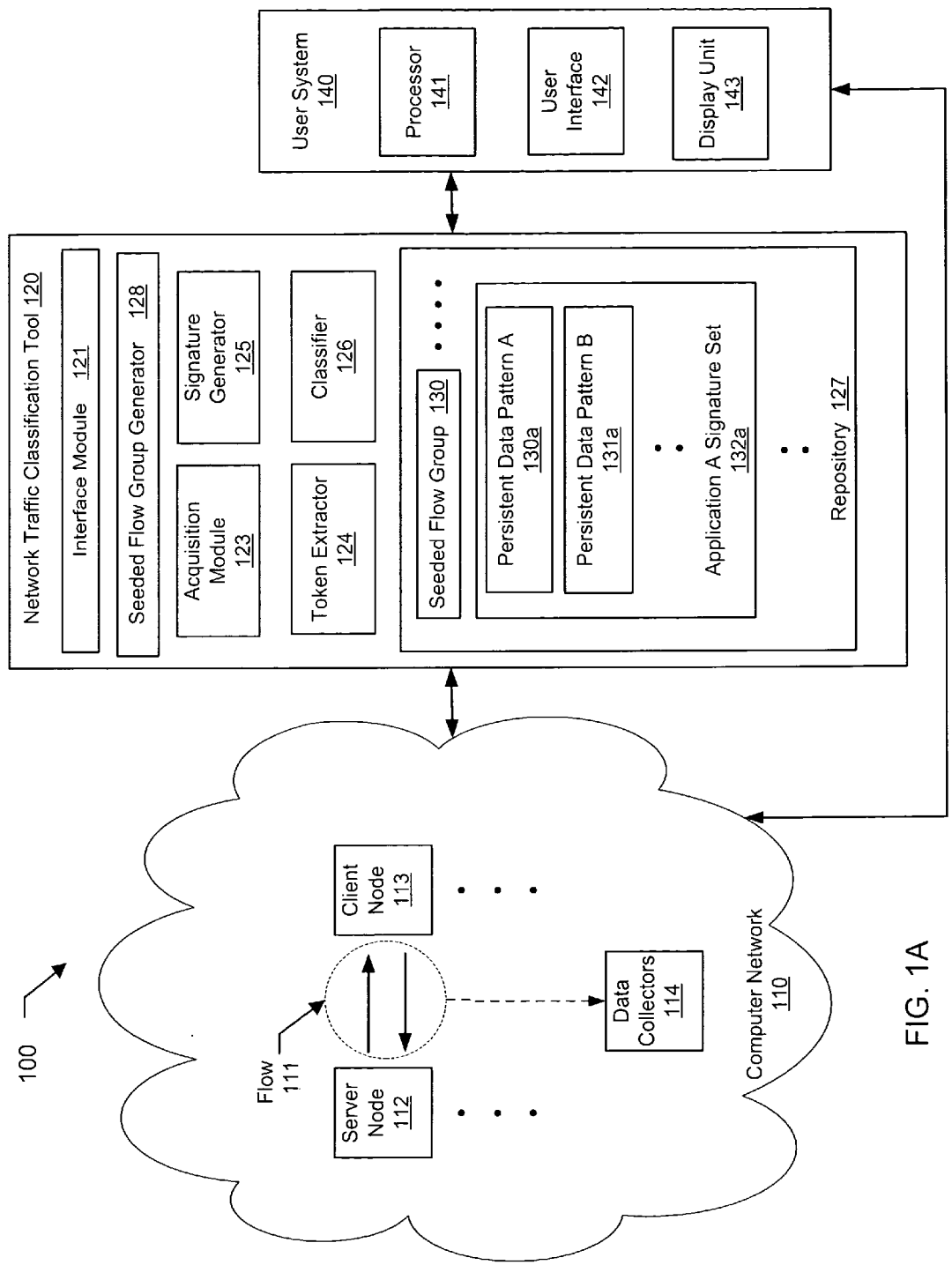

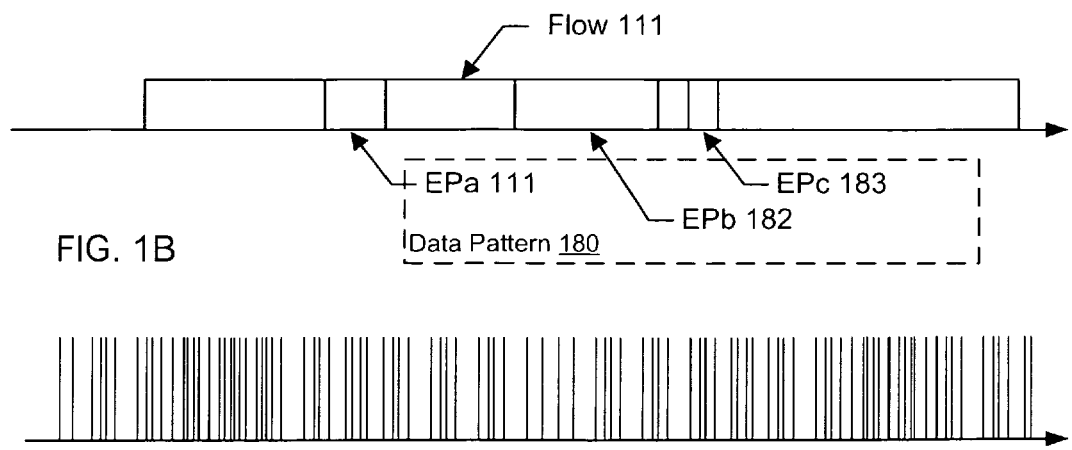
FIG. 1B
FIG. 1C
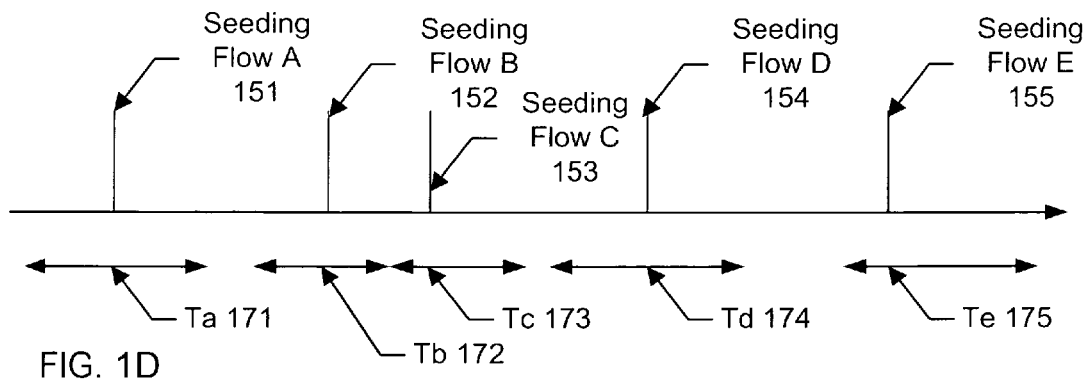
FIG. 1D
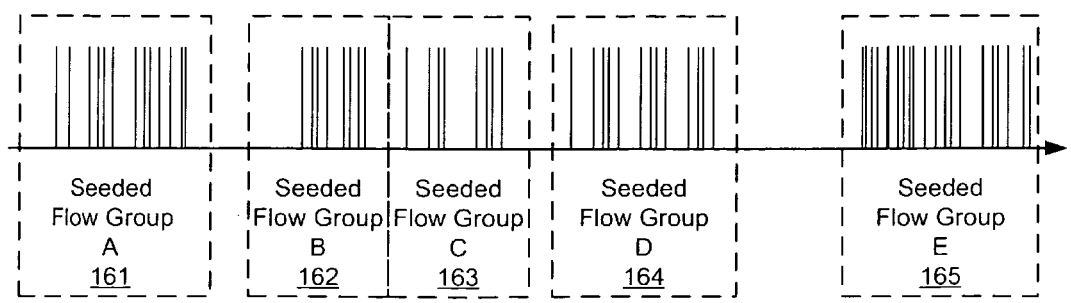
FIG. 1E

SYSTEM AND METHOD FOR EXTRACTING SIGNATURES FROM SEEDED FLOW GROUPS TO CLASSIFY NETWORK TRAFFIC

BACKGROUND OF THE INVENTION

Identifying the flows generated by different application-layer protocols is of major interest for network operators. Such identification enables QoS (quality of service) engineering for different types of traffic, such as voice and video traffic, and enables specific applications such as traffic forensics applications, network security applications, etc. Moreover, it enables ISPs to control resource intensive applications, such as peer-to-peer (P2P) applications, to limit and/or control application traffic and usage. Similarly, in enterprise networks, it is very important for administrators to know activities on their network, such as services that users are running, the applications dominating network traffic, etc.

Throughout this disclosure, the term "flow" refers to a sequence of packets exchanged between two network nodes, referred to as a source and a destination of the flow where the source or the destination may be the originator of the exchange. Generally, in an IP network, such as the Internet, a flow is identified by a 5-tuple of <source IP address, destination IP address, source port, destination port, protocol> where the payload of the flow may be represented by a string of alphanumeric characters and other sequences of bits.

SUMMARY

In general, in one aspect, the invention relates to a method for classifying network traffic in a network. The method includes (a) generating, by a processor of a computer system during a training phase, a signature set, comprising (i) obtaining, from the network traffic and based on a pre-determined selection criterion, a plurality of seeding flows, (ii) obtaining, from the network traffic and based on a pre-determined seeding criterion, a plurality of seeded flow groups, each comprising a plurality of flows associated with a seeding flow of the plurality of seeding flows, (iii) detecting, from at least two seeded flow groups of the plurality of seeded flow groups, a persistent data pattern having a frequency of occurrence in each of the two seeded flow groups exceeding a pre-determined data pattern occurrence threshold, and (iv) including the persistent data pattern as a signature in the signature set, and (b) classifying, by the processor during a classifying phase, a new flow obtained from the network traffic, comprising (i) generating a comparison result by comparing the new flow to the signature set, and (ii) classifying, in response to the comparison result meeting a pre-determined classifying criterion, the new flow as being generated by an application associated with the signature set.

In general, in one aspect, the invention relates to a system for classifying network traffic in a network. The system includes (a) a hardware processor, (b) an acquisition module executing on the hardware processor and configured to obtain, during a training phase from the network traffic, a training set comprising a plurality of flows, (c) a seeded flow generator executing on the hardware processor and configured to (i) obtaining, from the training set and based on a pre-determined selection criterion, a plurality of seeding flows, and (ii) obtaining, from the training set and based on a pre-determined seeding criterion, a plurality of seeded flow groups, each comprising a plurality of flows associated with a seeding flow of the plurality of seeding flows, (d) a signature generator executing on the hardware processor and configured to generate, during the training phase, a signature set by (i) detecting, from at least two seeded flow groups of the plurality of seeded flow groups, a persistent data pattern having a frequency of occurrence in each of the two seeded flow groups exceeding a pre-determined data pattern occurrence threshold, and (ii) including the persistent data pattern as a signature in the signature set, and (e) a classifier executing on the hardware processor and configured to classify, during a classifying phase, a new flow obtained from the network traffic based on the signature set by (i) generating a comparison result by comparing the new flow to the signature set of the application, and (ii) classifying, in response to the comparison result meeting a pre-determined classifying criterion, the new flow as being generated by an application associated with the signature set.

Other aspects and advantages of the invention will be apparent from the following description and the appended claims.

BRIEF DESCRIPTION OF DRAWINGS

FIG. 1A shows a system block diagram according to aspects of the invention, while FIGS. 1B-1E show different representations of flows and flow groups.

DETAILED DESCRIPTION

Figure 2A:
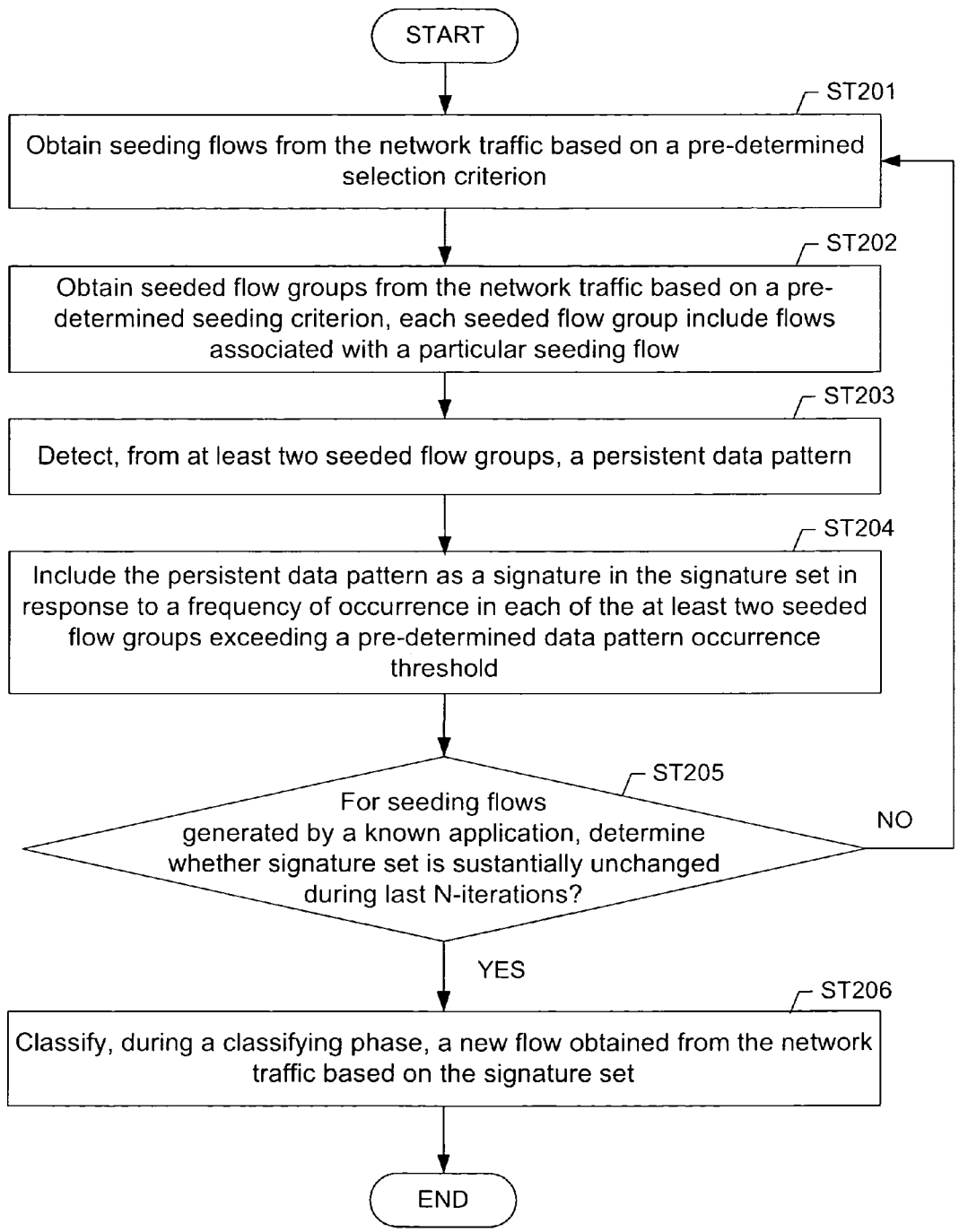
FIGS. 2A and 2B show method flow charts according to aspects of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

Generally, the term "flow" may refer to a unidirectional flow or a bi-directional flow. A unidirectional flow includes only data packets traveling in one direction, either from server node to client node or vice versa. A bi-directional flow includes data packets traveling in both directions from server node to client node, and vice versa. The originator of the flow may be the server node or the client node. A bi-directional flow includes a combination of two unidirectional flows traveling in opposite directions. In one or more embodiments, a bi-directional flow is classified by classifying the two unidirectional flows separately. Classifying the network traffic based on unidirectional flows provides a solution to the routing asymmetry at the Internet backbone, where one direction of a flow is often missing. Using unidirectional flows allows the classifier to be deployed anywhere in the network.

Embodiments of the invention provide a method, system, and computer readable medium for network traffic classification that can be applied to application/traffic profiling. Specifically, for each incoming flow observed on a network, a classifier attempts to map the flow to the application from which the flow is generated. In one or more embodiments, the application is one available from a pre-determined source of applications, such as Google© Play Store, Apple© App Store, etc.

In one or more embodiments, a signature/fingerprint for an application is dynamically (i.e., while monitoring the traffic flows) extracted for the flows and then used to classify the following flows that belong to the same application. In one or more embodiments, new signatures/fingerprints are identified and incrementally added to an initial set of signatures. For example, the initial signature set may be an incomplete signature set for the application. In one or more embodiments, there is no initial knowledge of the application and the newly generated signatures/fingerprints merely identify presence of a not-yet identified application. Subsequently, identity (e.g., name) of the application is discovered from further analysis of the flows classified using the newly generated signatures/fingerprints.

Two main methods are described in the following disclosure, each one having several variants. The first method starts from flows (referred to as the seeding flows) known to belong to a given application and considers the other flows (referred to collectively as seeded flows or referred to in groups as seeded flow groups) that are temporally close to the initial seeding flows. The second method groups flows not known to belong to any application for which signatures/fingerprints have been previously developed. For example, the seeding flows may be selected from the captured flows based on a statistical traffic pattern or even selected randomly. In both methods, persistent data patterns are detected across the seeded flow groups. Accordingly, groups that contain persistent data patterns are considered as belonging to the same application, possibly generated from different runs of the same application. Signatures/fingerprints are then extracted based on the persistent data patterns found in these seeded flow groups.

FIG. 1A shows a diagram of a system (100) for network traffic classification and application/traffic profiling in accordance with one or more embodiments. In one or more embodiments of the invention, one or more of the components shown in FIG. 1A may be omitted, repeated, and/or partitioned in a different manner. Accordingly, embodiments of the invention should not be considered limited to the specific arrangements of components shown in FIG. 1A.

As shown in FIG. 1A, the system (100) includes a network traffic classification tool (120), a user system (140), and a computer network (110). The network traffic classification tool (120) includes data repository (127), one or more application interfaces (121), acquisition module (123), token extractor (124), signature generator (125), and classifier (126). The user system (140) includes a processor (141), a user interface (142), and a display unit (143). The computer network (110) may include wired and/or wireless portions of the Internet and/or other data communications networks such as wide area networks (WANs), local area networks (LANs), etc. In one or more embodiments, the computer network (110) is a communications network. For example, the computer network (110) may also include one or more of cellular communications network, satellite communications network, or other mobile communications network.

Further, the computer network (110) includes network nodes (e.g., server node (112), client node (113), data collectors (114), etc.), which are the devices configured with computing and communication capabilities for executing applications in the network (110). As shown in FIG. 1A, the server node (112) and client node (113) communicate with each other by exchanging data packets forming a flow (111), which includes two unidirectional flows represented by two arrows. Although shown as a bi-directional flow in the example depicted in FIG. 1A, the flow (111) may also be a single unidirectional flow in other examples. In one or more embodiments, the server node (112) and the client node (113) exchange data packets in the flow (111) as a result of an application executing on the server node (112) and the client node (113). In this context, the flow (111) is referred to as being generated by the application executing on the server node (112) and client node (113). In one or more embodiments, the client node (113) may be a mobile device, such as a smartphone, a tablet computer, a hand held gaming device, etc. In such embodiments, the application may be referred to as a mobile application, mobile app, or app. In one or more embodiments, certain device(s) (e.g., data collectors (114)) within the computer network (110) may be configured to collect network data (e.g., flow (111)) for providing to the network traffic classification tool (120). Each of these components is described below. One of ordinary skill in the art will appreciate that embodiments are not limited to the configuration shown in FIG. 1A.

In one or more embodiments of the invention, the network traffic classification tool (120) is configured to interact with the computer network (110) using one or more of the application interface(s) (121). The interface module (121) may be configured to receive data (e.g., flow (111)) from the computer network (110) and/or store received data to the data repository (127). Such network data captured over a time period (e.g., an hour, a day, a week, etc.) is referred to as a trace or network trace. Network trace contains network traffic data related to communications between nodes in the computer network (110). For example, the network trace may be captured on a routine basis using the data collectors (114) and selectively sent to the interface module (121) to be formatted and stored in the repository (127) for analysis. For example, the data collectors (114) may be a packet analyzer, network analyzer, protocol analyzer, sniffer, netflow device, semantic traffic analyzer (STA), or other types of data collection devices that intercept and log data traffic passing over the computer network (110) or a portion thereof. In one or more embodiments, the data collectors (114) may be deployed in the computer network (110) by a network communication service provider (e.g., ISP), a network security service provider, a cellular service provider (CSP) or other business or government entities. The data collector (114) may be configured to capture and provide network trace to the interface module (121) through an automated process, such as through a direct feed or some other form of automated process. Such network data may be captured and provided on a periodic basis (e.g., hourly, daily, weekly, etc.) or based on a trigger. For example, the trigger may be activated automatically in response to an event in the computer network (110) or activated manually through the user system (140). In one or more embodiments, the data collectors (114) are configured and/or activated by the network traffic classification tool (120).

In one or more embodiments, the user system (140) is configured to interact with a user using the user interface (142). The user interface (142) may be configured to receive data and/or instruction(s) from the user. The user interface (142) may also be configured to deliver information (e.g., a report or an alert) to the user. In addition, the user interface (142) may be configured to send data and/or instruction(s) to, and receive data and/or information from, the network traffic classification tool (120). The user may include, but is not limited to, an individual, a group, an organization, or some other entity having authority and/or responsibility to access the network traffic classification tool (120). Specifically, the context of the term "user" here is distinct from that of a user of the computer network (110) or a user of the application executing on the sever node (112) and the client node (113). The user system (140) may be, or may contain a form of an internet-based communication device that is capable of communicating with the interface module (121) of the network traffic classification tool (120). Alternatively, the network traffic classification tool (120) may be part of the user system (140). The user system (140) may correspond to, but is not limited to, a workstation, a desktop computer, a laptop computer, or other user computing device.

In one or more embodiments, the processor (i.e., central processing unit (CPU)) (141) of the user system (140) is configured to execute instructions to operate the components of the user system (140) (e.g., the user interface (142) and the display unit (143)).

In one or more embodiments, the user system (140) may include a display unit (143). The display unit (143) may be a two dimensional (2D) or a three dimensional (3D) display configured to display information regarding the computer network (e.g., browsing the network traffic data) or to display intermediate and/or final results of the network traffic classification tool (120) (e.g., report, alert, etc.), including intermediate and/or final results of the signature set selection process.

As shown, communication links are provided between the network traffic classification tool (120), the computer network (110), and the user system (140). A variety of links may be provided to facilitate the flow of data through the system (100). For example, the communication links may provide for continuous, intermittent, one-way, two-way, and/or selective communication throughout the system (100). The communication links may be of any type, including but not limited to wired, wireless, and a sequence of links separated by intermediate systems routing data units. In one or more embodiments, the network traffic classification tool (120), the user system (140), and the communication links may be part of the computer network (110).

In one or more embodiments, a central processing unit (CPU, not shown) of the network traffic classification tool (120) is configured (e.g., programmed) to execute instructions to operate the components of the network traffic classification tool (120). In one or more embodiments, the memory (not shown) of the network traffic classification tool (120) is configured to store software instructions for analyzing the network trace to extract tokens, generating classification signatures, and classifying new flows captured from the network traffic to identify the application(s) that generates the new flows. The memory may be one of a variety of memory devices, including but not limited to random access memory (RAM), read-only memory (ROM), cache memory, and flash memory. The memory may be further configured to serve as back-up storage for information stored in the data repository (127).

The network traffic classification tool (120) may include one or more system computers, which may be implemented as a server or any conventional computing system having a hardware processor. However, those skilled in the art will appreciate that implementations of various technologies described herein may be practiced in other computer system configurations known to those skilled in the art.

In one or more embodiments, the network traffic classification tool (120) is configured to obtain and store data in the data repository (127). In one or more embodiments, the data repository (127) is a persistent storage device (or set of devices) and is configured to receive data from the computer network (110) using the interface module (121). The data repository (127) is also configured to deliver working data to, and receive working data from, the acquisition module (123), token extractor (124), signature generator (125), and classifier (126). The data repository (127) may be a data store (e.g., a database, a file system, one or more data structures configured in a memory, some other medium for storing data, or any suitable combination thereof), which may include information (e.g., seeded flow group (130), application A signature set (132*a*), etc.) related to the network traffic classification.

The data repository (127) may be a device internal to the network traffic classification tool (120). Alternatively, the data repository (127) may be an external storage device operatively connected to the network traffic classification tool (120).

In one or more embodiments, the network traffic classification tool (120) is configured to interact with the user system (140) using the interface module (121). The interface module (121) may be configured to receive data and/or instruction(s) from the user system (140). The interface module (121) may also be configured to deliver information and/or instruction(s) to the user system (140). In one or more embodiments, the network traffic classification tool (120) is configured to support various data formats provided by the user system (140).

In one or more embodiments, the network traffic classification tool (120) includes the acquisition module (123) that is configured to obtain a network trace from the computer network (110), for example via data collectors (114). In one or more embodiments, the acquisition module (123) works in conjunction with the data collectors (114) to parse data packets and collate data packets belonging to the same flow tuple (i.e., the aforementioned 5-tuple) for flow reconstruction and for accumulating multiple flows (e.g., flow (111)) to form the network trace. Although not explicitly shown FIG. 1A, such network trace may be stored in the repository (127).

In one or more embodiments, a flow parser (e.g., acquisition module (123) in conjunction with data collectors (114)) reconstructs (e.g., eliminates redundant packets, collates packets into a correct sequence, etc.) all the packets that correspond to the same traffic flow identified by the aforementioned 5-tuple. In one or more embodiments, the flows are captured and parsed throughout a pre-configured time interval recurring on a periodic basis (e.g., every minute, hourly, daily, etc.) or triggered in response to an event.

In one or more embodiments of the invention, the network traffic classification tool (120) includes the token extractor (124) that is configured to extract, from each flow (e.g., flow (111)) in the network trace, one or more extracted portion(s) to form a data pattern (i.e., an arrangement of data bits). Each extracted portion is a contigous section of the flow while any two extracted portions may or may not be contiguous to each other. The data pattern may be represented mathematically as a vector having one or more vector elements that are the extracted portions. The vector representing the data pattern is referred to as a token. In other words, the vector is the mathematical representation of the token.

FIG. 1B shows, along a timeline represented by an arrow, the flow (111) and an example data pattern (180) formed by EPa(181), EPb(182), and EPc(183) that are extracted portions of the flow (111). The data pattern is formed by the sequence of these extracted portions and can be mathematically represented as a three element vector [EPa(181), EPb(182), EPc(183)]. As noted above, this three element vector, having the extracted portions EPa(181), EPb(182), and EPc(183) as its vector elements, is referred to as a token. Note that a data pattern with a single extracted portion is a special case single element vector. Note that a token may include more than three extracted portions, i.e., an arbitrary number of extracted portions. Throughout this disclosure, the terms "token" and "data pattern" may be used interchangeably depending on the context. In one or more embodiments, an extracted portion comprises a pre-determined portion of the flow, such as the host name or domain name. In one or more embodiments, the token comprises a number of extracted portions of the flow where the extracted portions are arranged in a sequence. For example, an extracted portion may be a substring where the flow, or part thereof, is represented by a character string. In this example, the extracted portions may be extracted based on pre-determined delimiters (i.e., separators), such as "&", "/", "=", "?", "#", EOL, etc. A particular type of extracted portion is a Key-Value (K-V) pair that is included in the flow. An example K-V pair may have the key as a host name or a domain name, while the value is a substring delimited by "?", "#", EOL, etc. In one or more embodiments, a token is a sequence of K-V pairs. In one or more embodiments, the K-V pairs are found in the query part of an HTTP URL. In one or more embodiments, the K-V pairs are also found in at least one of the headers and the body of an HTTP message, e.g., in a JSON dictionary, an XML formatted document, a JAVA© dictionary, etc. known to those skilled in the art. For example, K-V pairs may include following categories: web-object-dependent K-V pairs, run-dependent K-V pairs, application-dependent K-V pairs, developer-dependent K-V pairs, platform-dependent K-V pairs, among other categories.

In one or more embodiments, types (e.g., host name, K-V pair, extracted portions delimited by a pre-determined set of delimiters) of tokens extracted from the token extractor (124) are the same for each flow (e.g., flow (111)) processed by the token extractor (124) for token extraction. Specifically, the token extractor (124) uses the same pre-defined token types to process flows generated from different applications. Generally, different types of tokens may be effective for classifying different types of applications and different states an application may be in. Further, an application may be effectively classified using multiple types of tokens. In one or more embodiments, multiple types of tokens are used. Some tokens may each contain a fixed number of extracted portion(s), other tokens may each contain a variable number of extracted portion(s).

In one or more embodiments of the invention, the network traffic classification tool (120) includes the seeded flow group generator (128) that is configured to select seeding flows from the network trace based on a pre-determined selection criterion. For example, the network trace may be obtained by the acquisition module (123) as described above. Further, based on each selected seeding flow, the seeded flow group generator (128) extracts a seeded flow group from the network trace based on a pre-determined seeding criterion. In particular, each seeded flow group includes a group of flows associated with a seeding flow based on a pre-determined temporal relationship. An example network trace is shown in FIG. 1C, where the horizontal arrow represents the time progression (referred to as the timeline) and each vertical line segment represents a flow, more specifically the beginning of a flow, possibly from the same source. Example seeding flows are shown in FIG. 1D, where vertical line segments along the timeline represent beginnings of the seeding flow A (151), seeding flow B (152), seeding flow C (153), seeding flow D (154), and seeding flow E (155), respectively. Each of these seeding flows is associated with a proximity time window (i.e., for defining the pre-determined temporal relationship), namely the proximity time window Ta(171), proximity time window Tb(172), proximity time window Tc(173), proximity time window Td(174), and proximity time window Te(175). Example seeded flow groups are shown in FIG. 1E, such as the seeded flow group A (161), seeded flow group B (162), seeded flow group C (163), seeded flow group D (164), and seeded flow group E (165), that are constructed from the corresponding seeding flows shown in FIG. 1D from respective seeding flows based on their corresponding proximity time window. In particular, vertical line segments along the timeline and within each of these proximity time windows represent beginnings of flows that are temporally related to a corresponding seeding flow. Although the example seeded flow groups are shown in FIG. 1E to be disjoint in time, multiple seeded flow groups may also overlap each other in time. Further, there may also be flows from multiple applications interlaced in any of the example seeded flow group that are omitted in FIG. 1E.

In one or more embodiments, the proximity time window shown in FIG. 1D may be determined based on a predefined formula. For example, the span of the proximity time window may be symmetrical surrounding the associated seeding flow. In another example, the span of the proximity time window may be asymmetrical surrounding the associated seeding flow. In yet another example, the span of the proximity time window may have a fixed length for all seeding flows. In still another example, the span of the proximity time window may have a variable length with respect to different seeding flows.

In one or more embodiments, the selection criterion of the seeding flows is based on an initial signature set of the application A. For example, the initial signature set may be an incomplete set of signatures of an identified or un-identified application A. In other words, the name and other attribute of the application A may be either known or unknown. In either case, flows classified as being generated by the application A based on this initial signature set are used as seeding, flows to generate seeded flow groups.

In one or more embodiments, there is no initial knowledge (e.g., name, initial signature, or even the mere presence) of the application A. In such embodiments, the seeding flows may be randomly selected from the network trace or selected based on some statistical algorithm, such as flows sent to different servers and frequently appearing close to each other in time. In other words, the selection criterion of the seeding flows is random selection or selection by a statistical formula. In one embodiment, each flow in the network trace is selected as a seeding flow. In another embodiment, every Nth flow in the network trace, where N is a predetermined integer, is chosen as a seeding flow. In one or more embodiment, more than one seeding flow may be selected to form a single seeded flow group.

In one or more embodiments, the seeding criterion of the seeded flow groups can be defined in several ways. As a first example, the seeded flow group (130) (e.g., the seeded flow group A (161), seeded flow group B (162), seeded flow group C (163), seeded flow group D (164), seeded flow group E (165), etc.) may include flows that co-occur with the seeding flow (e.g., the seeding flow A (151), seeding flow B (152), seeding flow C (153), seeding flow D (154), seeding flow E (155), etc.). Specifically, the flows in the seeded flow group either (i) start before the end of the seeding flow and end after the beginning of the seeding flow, or (ii) end after the beginning of the seeding flow and had started before the end of the seeding flow.

As a second example, the seeded flow group (130) (e.g., the seeded flow group A (161), seeded flow group B (162), seeded flow group C (163), seeded flow group D (164), seeded flow group E (165), etc.) may include flows that start within a given time period from the beginning, of the seeding flow (e.g., the seeding flow A (151), seeding flow B (152), seeding flow C (153), seeding flow D (154), seeding flow E (155), etc.). For example, the given time period is defined by the proximity time windows surrounding each seeding flow as shown in FIG. 1D.

As a third example, the seeded flow group (130) (e.g., the seeded flow group A (161), seeded flow group B (162), seeded flow group C (163), seeded flow group D (164), seeded flow group E (165), etc.) may include flows that start within a given time period from the end of the seeding flow (e.g., the seeding flow A (151), seeding flow B (152), seeding flow C (153), seeding flow D (154), seeding flow E (155), etc.). For example, the given time period is defined by the proximity time window surrounding each seeding flow as shown in FIG. 1D.

As a fourth example, the seeded flow group (130) (e.g., the seeded flow group A (161), seeded flow group B (162), seeded flow group C (163), seeded flow group D (164), seeded flow group E (165), etc.) may include flows that end within a given time period from the beginning of the seeding flow (e.g., the seeding flow A (151), seeding flow B (152), seeding flow C (153), seeding flow D (154), seeding flow E (155), etc.). For example, the given time period is defined by the proximity time window surrounding each seeding flow as shown in FIG. 1D.

As a fifth example, the seeded flow group (130) (e.g., the seeded flow group A (161), seeded flow group B (162), seeded flow group C (163), seeded flow group D (164), seeded flow group E (165), etc.) may include flows that end within a given time period from the end of the seeding flow (e.g., the seeding flow A (151), seeding flow B (152), seeding flow C (153), seeding flow D (154), seeding flow E (155), etc.). For example, the given time period is defined by the proximity time window surrounding each seeding flow as shown in FIG. 1D.

As a sixth example, the seeded flow group (130) (e.g., the seeded flow group A (161), seeded flow group B (162), seeded flow group C (163), seeded flow group D (164), seeded flow group E (165), etc.) may include flows that co-occur with each other and at least one of them co-occur with the seeding flow (e.g., the seeding flow A (151), seeding flow B (152), seeding flow C (153), seeding flow D (154), seeding flow E (155), etc.).

As a seventh example, the seeded flow group (130) (e.g., the seeded flow group A (161), seeded flow group B (162), seeded flow group C (163), seeded flow group D (164), seeded flow group E (165), etc.) may include flows that start within a given time period from the beginning of each other and at least one of them with the seeding flow (e.g., the seeding flow A (151), seeding flow B (152), seeding flow C (153), seeding flow D (154), seeding flow E (155), etc.). For example, the given time period has the same length as the proximity time window surrounding each seeding flow as shown in FIG. 1D.

As an eighth example, the seeded flow group (130) (e.g., the seeded flow group A (161), seeded flow group B (162), seeded flow group C (163), seeded flow group D (164), seeded flow group E (165), etc.) may include flows that start within a given time period from the end of each other and at least one of them with the seeding flow (e.g., the seeding flow A (151), seeding flow B (152), seeding flow C (153), seeding flow D (154), seeding flow E (155), etc.). For example, the given time period has the same length as the proximity time window surrounding each seeding flow as shown in FIG. 1D.

As a ninth example, the seeded flow group (130) (e.g., the seeded flow group A (161), seeded flow group B (162), seeded flow group C (163), seeded flow group D (164), seeded flow group E (165), etc.) may include flows that end within a given time period from the beginning of each other and at least one of them with the seeding flow (e.g., the seeding flow A (151), seeding flow B (152), seeding flow C (153), seeding flow D (154), seeding flow E (155), etc.). For example, the given time period has the same length as the proximity time window surrounding each seeding flow as shown in FIG. 1D.

As a tenth example, the seeded flow group (130) (e.g., the seeded flow group A (161), seeded flow group B (162), seeded flow group C (163), seeded flow group D (164), seeded flow group E (165), etc.) may include flows that end within a given time period from the end of each other and at least one of them with the seeding flow (e.g., the seeding flow A (151), seeding flow B (152), seeding flow C (153), seeding flow D (154), seeding flow E (155), etc.). For example, the given time period has the same length as the proximity time window surrounding each seeding flow as shown in FIG. 1D.

As an eleventh example, any of the example criterion above is applied progressively along the timeline only until a flow is found belonging to the application A and being sent from the same IP address as application A or a set of IP addresses associated to application A. Although not shown in FIGS. 1C and 1D, the seeded flow group A (161) based on the seeding flow A (151) may overlap the seeding flow B (152) or overlap a leading portion of the proximity time window Tb (172). As a result, the seeded flow group A (161) and the seeded group B (162) overlap each other and are combined in this example.

As a twelfth example, a seeded flow group may be generated based on multiple seeding flows. Although not shown in FIGS. 1C and 1D, the seeded flow group A (161), the seeded flow group B (162), and the seeded flow group C (163) may be combined and referred to as associated with three seeding flows, namely the seeding flow A (151), seeding flow B (152), and seeding flow (153). For an unknown flow to be included in this combined seeded flow group, it has to satisfy a seeding criterion with respect to at least a predefined fraction (e.g., ⅓, ⅔, or 3/3) of the three seeding flows.

In one or more embodiments, two or more of the example seeding criteria described above may be combined using a logic AND function if they are not conflicting to each other. In one or more embodiments, two or more of the example seeding criteria described above may be combined using a logic OR function. In one or more embodiments, two or more of the example seeding criteria described above may be combined hierarchically using logic AND and OR functions. For example, a combined criterion may be in the form of (A*B)+(C*D)*(E+F) where A, B, C, D, E, F represent the example seeding criteria described above, * represents the logic AND function, and + represents the logic OR function.

In one or more embodiments of the invention, the network traffic classification tool (120) includes the signature generator (125) that is configured to generate, from seeded flow groups (e.g., seeded flow group (130), etc.), a signature set for an application executing in the network (110). An example signature set associated with an application A is shown in FIG. 1A as the application A signature set (132*a*). Although not explicitly shown in FIG. 1A, the application A may be executing on the server node (112).

In one or more embodiments, the identity (e.g., name) of the application A is known prior to generating the application A signature set (132*a*). For example, the seeded flow group (130) and other inputs to the signature analyzer (125) may be generated using seeding flows that are classified as being generated by the application A based on the aforementioned initial signature set. In such embodiments, additional signatures generated in this manner are incrementally added to the initial signature set and eventually expand the initial signature set into a complete signature set of the application A.

In one or more embodiments, there is no initial knowledge of the application A and the newly generated application A signature set (132*a*) merely identifies the presence of a not yet identified application that is referred to as the application A. For example, the seeded flow group (130) and other inputs to the signature analyzer (125) may be generated using seeding flows that are randomly selected or otherwise statistically selected from the network trace. Subsequently, further analysis of the flows classified as belonging to the application A may result in discovering its identity (e.g., name).

In one or more embodiments, flows in the seeded flow groups (e.g., seeded flow group (130)) may be processed by the token extractor (124) to extract a persistent data pattern (i.e., frequently occurring token), such as the persistent data pattern A (130a), persistent data pattern B (130b), etc. As noted above, a flow may be represented by a string, a data pattern may include one or more substrings extracted from the flow, and the token representing the data pattern is a vector having substring(s) for its element(s). An example token is described in reference to FIG. 1B above. In one or more embodiments, a data pattern (i.e., token) meeting a pre-determined frequency of occurrence criterion is referred to as a persistent data pattern and used as a signature in the application signature set, such as the application A signature set (132a). For example, the persistent data pattern A (130a), persistent data pattern B (130b), etc. satisfy the pre-determined frequency of occurrence criterion and thus included in the application A signature set (132a). In one or more embodiments, the signature generator (125) is configured to generate the application A signature set (132a) using the method described in reference to FIG. 2A below. In particular, the pre-determined frequency of occurrence criterion is described in reference to FIG. 2A below.

In one or more embodiments of the invention, the network traffic classification tool (120) includes the classifier (126) that is configured to classify a new flow (e.g., flow (111)) or a new flow set (containing multiple flows) obtained from the network traffic. In one or more embodiments, a new token set (containing one or more new token(s)) is extracted from the new flow or flow set by the token extractor (124) and compared, by the classifier (126) to one or more application signature sets (e.g., application A signature set (132a)). When the new token set is determined to be sufficiently similar (e.g., based on a pre-determined criterion) to a particular application signature set, the new flow or flow set is identified as being generated by the application associated with the matching signature set. Additional details of comparing the new flow to the application signature sets are described in reference to FIG. 2B below. In another embodiment, a token set is identified as being generated by the application associated with a matching signature set only if the corresponding token set is sufficiently different from the signature sets of all other applications in the repository.

While specific components are depicted and/or described for use in the units and/or modules of the network traffic classification tool (120), it will be appreciated that a variety of components with various functions may be used to provide the formatting, processing, utility and coordination functions necessary to modify various working data used by the network traffic classification tool (120). The components may have combined functionalities and may be implemented as software, hardware, firmware, or combinations thereof.

Figure 2B:
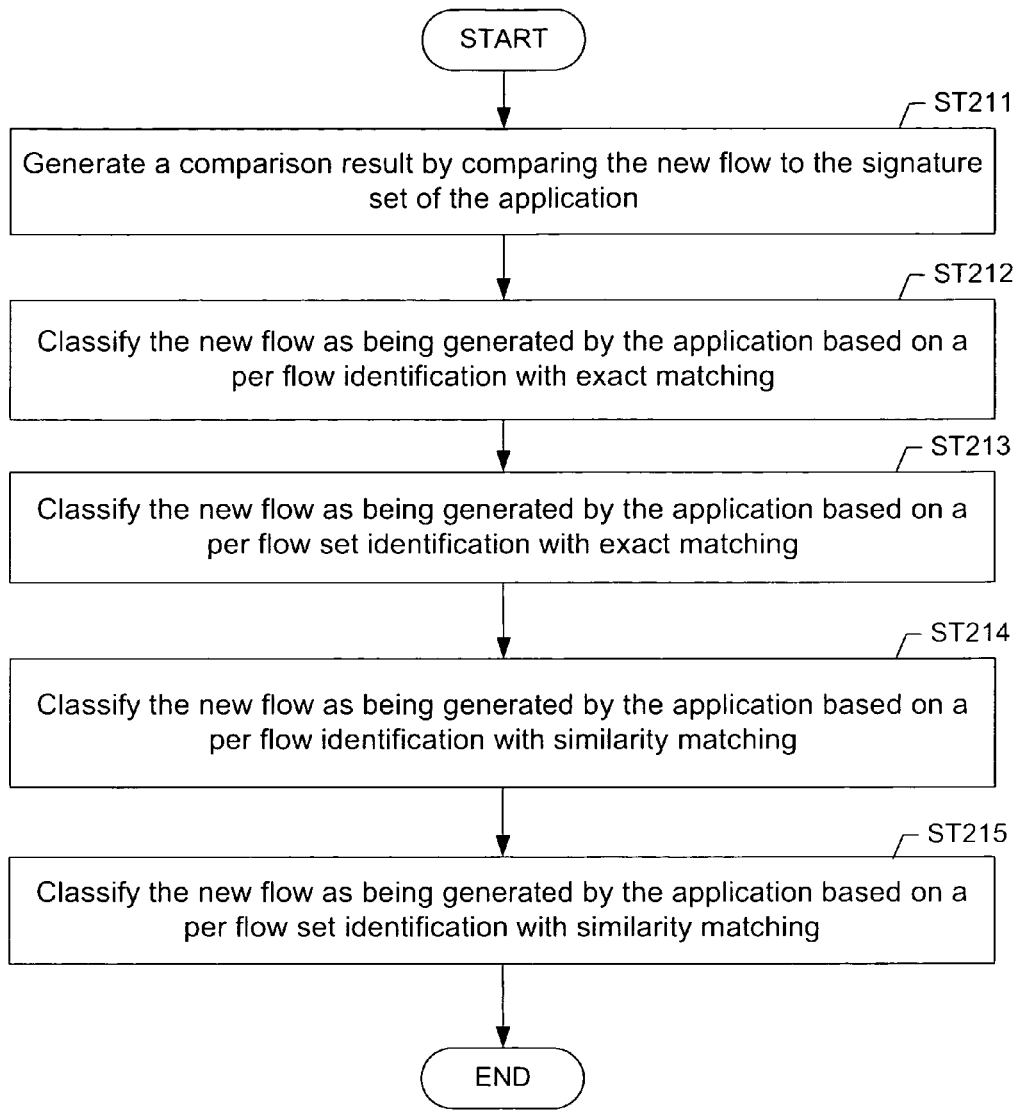

FIGS. 2A-2B depict flowcharts of methods in accordance with one or more embodiments of the invention. In one or more embodiments of the invention, one or more of the steps shown in FIGS. 2A-2B may be omitted, repeated, and/or performed in a different order. Accordingly, embodiments of the invention should not be considered limited to the specific arrangements of steps shown in FIGS. 2A-2B. In one or more embodiments of the invention, the methods depicted in FIGS. 2A-2B may be practiced using system (100) described with respect to FIGS. 1A and 1B above.

Generally, the method depicted in FIG. 2A is used to classify network traffic in a network by first generating, during a training phase, a set of signatures of an application executing in the network. The method depicted in FIG. 2B is used to determine a new flow as being generated by a particular application by comparing extracted tokens of the new flow to the set of signatures of the particular application.

As shown in FIG. 2A, initially in Step 201, a collection of flows are captured, during a training phase, to form a network trace. In one or more embodiments, seeding flows are obtained from the network trace based on a pre-determined selection criterion. For example, an initial signature set of an application A may be available as a starting point of the complete signature set. Specifically, the network trace is classified based on the initial signature set to identify flows being generated by the application A. The application A may be a known application or an unknown application. In other words, the name and/or or other attribute of the application A may be known or unknown at the time of selecting seeding flows. In either case, these classified flows are used as the seeding flows. As will be described later, the initial signature set is expanded into the complete signature set by incrementally adding additional signatures generated based on these seeding flows.

In another example, no initial signature set or any other information of the application A is available when selecting the seeding flows. In fact, there may not be any indication of the application A's presence. In one or more embodiments, the selection criterion for selecting seeding flows from the network trace is based on random selection, pseudo-random selection, or other statistical selection algorithm. In such embodiments, the seeding flows are selected with no dependence on any information of any present network application. In fact, the selection of the seeding flows and subsequent analysis may provide insight into whether an application's presence is identifiable.

In Step 202, seeded flow groups are obtained from the network trace based on a pre-determined seeding criterion. Specifically, each seeded flow group includes flows associated with a seeding flow identified in Step 201 above. In one or more embodiments, obtaining (or extracting) a seeded flow group is by (i) determining that a flow has a pre-determined temporal relationship with a seeding flow, and (ii) including the flow in a seeded flow group associated with the seeding flow. Examples of the pre-determined temporal relationship include, but not limited to those described in reference to FIGS. 1B-1D above. In one or more embodiments, determining that the flow has the pre-determined temporal relationship with the seeding flow is by detecting one or more of the conditions below:

(a) The flow starting before an end of the seeding flow and ending after a beginning of the seeding flow.

(b) The flow starting within a pre-determined time period from the beginning of the seeding flow.

(c) The flow starting within the pre-determined time period from the end of the seeding flow.

(d) The flow ending within the pre-determined time period from the beginning of the seeding flow.

(e) The flow ending within the pre-determined time period from the end of the seeding flow.

(f) All flow pairs in the group of the flow, the seeding flow, and at least one other flow starting before an end of each other and ending after a beginning of each other.

(g) All flow pairs in the group of the flow, the seeding flow, and at least one other flow starting within a pre-determined time period from the beginning of each other;

(h) All flow pairs in the group of the flow, the seeding flow, and at least one other flow starting within the pre-determined time period from the end of each other;

(i) All flow pairs in the group of the flow, the seeding flow, and at least one other flow ending within the pre-determined time period from the beginning of each other; and (j) All flow pairs in the group of the flow, the seeding flow, and at least one other flow ending within the pre-determined time period from the end of each other. Although specific example conditions are given in items (a)-(j) above, other conditions may also be used.

In one or more embodiments, two or more of the example conditions (i.e., seeding criterion) described above may be combined using a logic AND function if they are not conflicting to each other. In one or more embodiments, two or more of the example conditions described above may be combined using a logic OR function. In one or more embodiments, two or more of the example conditions described above may be combined hierarchically using logic AND and OR functions. For example, a combined criterion may be in the form of (A*B)+(C*D)*(E+F) where A, B, C, D, E, F represent the example conditions described above, * represents the logic AND function, and + represents the logic OR function.

In Step 203, data patterns are identified in flows in the seeded flow groups. Accordingly, one or more persistent data patterns are detected from at least two of the seeded flow groups based on a pre-determined persistence measure criterion. In one or more embodiments, a seeded flow group is discarded if no persistent data pattern can be found in it. The remaining seeded flow groups form a set of seeded flow groups sharing persistent data patterns.

In one or more embodiments, the flows in the seeded flow groups are generated by an application based on a character-based protocol or a byte-based protocol. In such embodiments, a flow in the seeded flow groups is represented as a string (e.g., character string or byte string) where one or more substrings (i.e., flow portions) of the flow is said to form a data pattern of the flow. Consistent with the terminology used in the description of FIG. 1A above, the data pattern may be represented mathematically as a token, that is a vector having substring(s) as its vector elements.

In one or more embodiments, the flows may be generated by the application based on HTTP protocol, where a substring may be extracted from the flow based on a header field, a pre-determined query field, a pre-determined delimiter, and/or a pre-determined K-V pair in the string. For web based applications, pre-allocated "query" field has already been standardized in Universal Resource Identifier (URI) embedded in HTTP traffic. Examples of the query fields are shown in TABLE 1 below.

TABLE 1

```
foo://www.example.com:8042/over/there?name=ferret#nose
 \_/   _____/_____/ _____/ \__/
  |           |             |          |       |
scheme    authority        path      query  fragment
```

As shown in TABLE 1, the authority field of the URI consists of a host name (i.e., www.example.com) and an optional port number (i.e., 8042); the host name consists of a domain name (i.e., example.com) and host identifier (i.e., www) within the domain. Further, the query field contains a K-V pair (i.e., K=name, V=ferret). Accordingly, the host name, domain name, K-V pair, etc. may be used as the substring to form the token. Further, the token may be composed from a combination of one or more portions of the URI identified by defining a set of separator symbols. For example, the URI may be broken into portions separated by symbols {"&", "/", "="}. As noted above, a K-V pair is a particular case of token where each token is the combination of two portions: a host name (or domain name) and substring delimited by pre-determined de-limitors (e.g., "?", "#", EOL, etc.).

TABLE 2 is an example of the HTTP GET message sent by the "AOL AIM" Android© application to server "b.aol.com". A set of substrings extracted using a predefined set of separators {"&", "/", "=", " ", ":", LF, CR} includes the substrings "AOL_AIM_Android," and "b.aol.com", which are included as two vector element of a token and used as a signature of Android© application "AOL AIM".

TABLE 2

/ping?ap_av=2.3.4.1&ap_id=20327cb3a98e82623afdf15c5aaf863d2
25b3ff9&ap_cr=Android&ap_ev=start&ap_la=en%5FUS&ap_pl=sdk&a
p_prm=market&ap_pv=2.3.3&ap_tz=GMT&ap_tzg=Etc%2FUniversal&a
p_cn=mobile&ap_v=1&h=com.aol.mobile.aim.android.application
&dm_dpi=240&dm_h=800&dm_w=480&ts=1338440033 HTTP/1.1
User-Agent: AOL_AIM_Android/2.3.4.1 (Android; 10; 2.3.3;
101070; en-US)
Content-Language: en-US
Cache-Control: no-store, no-cache
Accept: */*
Accept-Encoding: gzip
Cookie:
MUNAUTHID=1.20327cb3a98e82623afdf15c5aaf863d225b3ff9.10a9
Host: b.aol.com
Connection: Keep-Alive In one or more embodiments, for the token (i.e., data pattern) to be considered as occurring in a particular flow, the vector elements (e.g., substrings) are required to occur in the particular flow in the specific order as they appear in the token. In one or more embodiments, for the token to be considered as occurring in a particular flow, the vector elements (e.g., substrings) may occur in any order in the particular flow. In one or more embodiments, for the token to be considered as occurring in a particular flow, each of the vector elements (e.g., substrings) may occur separately in one of non-consecutive sections of the particular flow. In other words, the vector elements are not required to be adjacent to each other.

Various criteria may be used to qualify the token (i.e., data pattern) as a persistent token (i.e., persistent data pattern) occurring in a set of seeded flow groups. As a minimum, the set includes at least two seeded flow groups. Typically, the set may include tens or hundreds of seeded flow groups. An example criterion may require one of the following:

(a) the token has to occur in least one flow for each seeded flow group in the set.

(b) the token has to occur in least one flow for each seeded flow group in a minimum fraction of the set.

(c) the token has to occur in most one flow for each seeded flow group in the set.

(d) the token has to occur in most one flow for each seeded flow group in a minimum fraction of the set.

Another example criterion may require a minimum fraction of the vector elements (e.g., substrings) in the token to meet one of the following conditions:

(a) present in at least one flow for each seeded flow group in the set.

(b) present in at least one flow for each seeded flow group in a minimum fraction of the set.

(c) present in at most one flow for each seeded flow group in the set.

(d) present in at most one flow for each seeded flow group in a minimum fraction of the set.

Step 204, a frequency of occurrence of a persistent data pattern is computed. The persistent data pattern is identified as a signature and included in the signature set if the computed frequency of occurrence exceeds a pre-determined data pattern occurrence threshold. In particular, the frequency of occurrence corresponds to a tally of flows containing the persistent data pattern (i.e., persistent token). In one or more embodiments, the frequency of occurrence is represented by a persistence measure. For example, if a seeded flow group includes 100 flows and the persistent token is found in 65 flows, the frequency of occurrence corresponds to a tally is 65. In one or more embodiments, the persistence measure is a normalized quantity (e.g., a percentage) based on the tally, such as 65/100=65%.

In one or more embodiments, the persistence measure includes a per-seeded-flow-group persistence measure and a cumulative persistence measure. Specifically, the per-seeded-flow-group persistence measure is tallied over a single seeded flow group while the cumulative persistence measure is tallied over multiple seeded flow groups. In such embodiments, the pre-determined data pattern occurrence threshold includes a pre-determined per-seeded-flow-group persistence measure threshold and a pre-determined cumulative persistence threshold. In other words, when determining whether the token is a signature, the per-seeded-flow-group persistence measure of the token is compared to the pre-determined per-seeded-flow-group persistence measure threshold and the cumulative persistence measure of the token is compared to the pre-determined cumulative persistence threshold. For example, if a token always appear more than once in each seeded flow group with that token (the per-seeded-flow-group persistence measure threshold) and more than 70% of flow groups seeded to that application have that token (the cumulative persistence measure), it is concluded that the token is a signature. In one or more embodiments only the cumulative persistence measure is considered and a token is considered a signature only if more than a predefined percentage of flow groups seeded to that application have that token.

In one or more embodiments, a commonality measure is computed for the persistent token. The commonality measure represents a tally of the persistence token in the flows of other applications. In such embodiments, if the commonality measure is above a given threshold, the persistent token is not included in the signature set. In other words, when the persistent token appears in too many flows of too many other applications, it becomes less representative of any given application and is thus excluded from the signature set. In another embodiment, the commonality measure represents a tally of the presence of the token in flow groups not seeded to the application for which the token in being considered. In another embodiment, the commonality measure represents a tally of the presence of the token in flows not seeded in any flow group. In another embodiment, the commonality measure is a combination of two or more of the above.

In one or more embodiments, the persistent token is not immediately included in the signature set. Instead a candidate signature set is created for each application. An application associated with a candidate signature set is referred to as a candidate application of the candidate signature set. A given candidate signature can be found to match (exactly or by similarity) more than one candidate application. In one or more embodiments, statistics are taken over time to see how many flows matching a candidate signature are found within a predefined time range from a flow of each candidate application. In other words, statistics are collected on how frequently the candidate signature can be confirmed as a signature for each candidate application. In one or more embodiments, when the frequency of association to a particular candidate application is larger by a given threshold than the frequency of association to all other candidate applications over a minimum number of occurrences across each candidate application, the candidate signature is moved to the signature set of this particular candidate application and removed from the candidate signature sets of the other candidate applications. From this point on, this particular candidate application is referred to as the application for the signature set. In one or more embodiments, for the time a signature is in the candidate signature sets, a flow matching the signature is not considered as generated by a single application, but as potentially generated by one of the candidate applications. In other words, this method does not uniquely identify a single application that generated the flow, but at least to narrow the possibility to a limited set of candidate applications as well as to exclude other non-candidate applications. Further, the flow does not need to be considered any longer as unknown, i.e., generated by an unknown application.

In one or more embodiments, when several flows in the flow sets are identified by candidate signatures, a subset of N flows, with N>1, is considered for generating the signature. Although the signature extracted from each flow by itself cannot be uniquely associated to an application, their occurrence in a predetermined time range from a known flow F of application A enables to identify them uniquely as having been generated by application A. In other words, the aforementioned persistent data pattern includes multiple tokens from multiple flows. Specifically, the occurrence of the N flows within multiple flow groups seeded to application A, whether known or unknown, enables to associate them to application A and the corresponding tokens to be considered a signature for application A. Alternatively, in a possible embodiment the occurrence of N flows within multiple flow groups not seeded to any application implies that the multiple flow groups are seeded to an unknown application A and the tokens identifying the N flows constitute a signature for application A.

In those embodiments where seeding flows are generated by a known application, the signature set is incrementally modified/expanded as additional seeded flow groups are analyzed to update the cumulative persistence measure of each token previously identified as a signature in the signature set. Accordingly, the signature set converges into one final signature set of the application. In one or more embodiments, a method to finalize the signature set is described in reference to the iteration loop of Steps 205-Step 206-Step 201 through Step 204.

Specifically in Step 205, a determination is made as to whether the seeding flows are generated by a known application and whether the signature set formed in Step 204 has remained substantially unchanged during the past N-iterations. In one or more embodiments, N is a pre-determined integer, such as two, four, ten, etc. If the seeding flows are not generated by a known application, Step 205 is bypassed and the method proceeds directly to Step 206. If the seeding flows are generated by a known application and the determination is no or negative (i.e., the signature set has substantially changed during last N-iterations), the method returns to Step 201 where additional seeding flows are obtained for an additional iteration. In particular, the seeding flows may be selected from a new network trace based on the most recent version (i.e., as modified/expanded from the most recent iteration) of the signature set. In one or more embodiments, "substantially unchanged" requires that no more than M signatures change in the signature set, where M is a pre-determined integer (e.g., two, four, ten, etc.) or a pre-determined percentage (e.g., 1%, 5%, 10%, etc.)

If the seeding flows are generated by a known application and the determination in Step 205 is yes or positive (i.e., the signature set has remained substantially unchanged during last N-iterations), the method proceeds to Step 206.

In Step 206, a new flow obtained from the network traffic is classified during a classifying phase based on the signature set of the application. In one or more embodiments, the new flow is classified as being generated by the application from a collection of applications. In one or more embodiments, the collection of applications is defined by the source of applications, such as Google© Play Store, iTunes© Store, etc. Example applications include The Weather Channel©, Google+©, Google© Search, Pandora©, iMovie©, iPhoto©, Keynote©, iBooks©, iTunes©. TuneIn ©, iHeart©. Network protocols (e.g., a transport layer protocol or an application layer protocol) for communication between the network client node and server node may be identified to assist performing the method described above. For example, the network protocol may be a character-based protocol, such as HTTP, SMTP, POP, IMAP, SNMP, etc. known to those skilled in the art. In another example, the network protocol may be a byte-based protocol. In one or more embodiments, when classifying network traffic with respect to the application, the real time network traffic flows are first classified using application-layer protocol signatures. Examples of such application-layer protocols include HTTP, SMTP, MSN, BitTorrent Gnutella©, POP3, MSN©, EDonkey© Telnet©, Samba©, Yahoo© IM, etc. Accordingly, the classifier discards any new flow that has a different application-layer protocol than the application, to which the real time network traffic is to be classified. For example, if the application is known to generate HTTP flows, non-HTTP flows are discarded without being analyzed by the classifier.

As noted above, the method depicted in FIG. 2B is used to determine a new flow as being generated by a particular application by comparing extracted tokens of the new flow to the set of signatures of the particular application.

Given the network traffic generated by an application that needs to be identified (i.e., classified), the identification (i.e., classification) can be performed according to several methods. First of all the identification can be performed on single flow basis or on flow set basis. Second, identification can be based on an exact matching of tokens or on a best matching of tokens (as represented by a token similarity measure). In order to implement similarity matching, each token (i.e., signature) is assigned a weight based on how often it appears in multiple applications. For example, several applications using the doubleclick service may all have a common K-V pair such as "os=android" in their generated flows. In one or more embodiments, the weight assigned to a token (e.g., a vector containing K-V pairs) is the inverse of its cross-application popularity, i.e., occurrence frequency in different applications. In other words, if a token only occurs in flows generated by a single application, the token is assigned a high weight. Conversely, if a token occurs in one flow generated by one application and occurs in another flow generated by another application, the token is assigned a lower weight. If a token occurs in many flows each generated by a different application, the token is assigned an even lower weight.

In one or more embodiments, a combination of the per-flow versus per-flow-set identification and exact-matching versus similarity-matching identification can be used, thus resulting in four different types of criteria for application identification. Steps 212 through 215 describe flow classification using these four types of criteria. In one or more embodiments, a matched signature detected in the new flow to be classified may be presented to a user to determine whether it should be included or excluded for classifying the new flow. In other words, the user may exclude a signature of the application that is detected in the new flow from the per-flow or per-flow set identification criteria.

In one or more embodiments, one or more of these four steps may be omitted, repeated, and/or performed in a different order. For example, when classifying a new flow during the classification phase, Step 212 may be performed to determine if the new flow is generated by a particular application. If the determination is yes or positive, the new flow is successfully classified using the per flow identification with exact matching. If the determination is no or negative, i.e., the new flow fails to be classified based on this criterion, it is classified further in Step 213 using per flow set identification with exact matching. If the new flow still fails to be classified in Step 213, it is classified further in Step 214 using per flow identification with similarity matching. If the new flow still fails to be classified in Step 214, it is classified further in Step 215 using per flow set identification with similarity matching. If the new flow still fails to be classified in Step 215, it is then determined to be not generated by the particular application. In another example, the sequential classification may be performed using the Steps 212-215 in a reverse order. In yet another example, any single Step or a sequence of two or more of these Steps may be used.

As shown in FIG. 2B, initially in Step 211, a comparison result is generated by comparing the new flow to the signature set of the application. Accordingly, the new flow is classified as being generated by the application or not based on whether the comparison result meets a pre-determined classifying criterion.

In Step 212, the pre-determined classifying criterion requires per-flow identification with exact matching.

In one or more embodiments, a flow is considered to have an exact matching with the signature set if it includes the entirety of at least one token (i.e., a combination of flow portions extracted during the training phase) included in the signature set. In such embodiments, classifying the new flow as being generated by the application is based on detecting from the new flow an exact match to the combination of flow portions of at least one signature in the signature set. As noted above in reference to FIG. 2A, the token included in the signature set is required to be a persistent token, throughout the discussion of FIG. 2B, the terms "token," "token included in the signature set," and 'persistent token' may be used interchangeably depending on the context.

In one or more embodiments, a flow is considered to have an exact matching with the signature set if it includes the entirety of each token (i.e., all flow portions in the token that were extracted during the training phase) included in the signature set. In such embodiments, classifying the new flow as being generated by the application is based on detecting from the new flow all signatures in the signature set in their entirety. In other words, all flow portions in each signature are included in the new flow.

In Step 213, the pre-determined classifying criterion requires per-flow-set identification with exact matching. In one or more embodiments, a set of flows extracted from the traffic are considered as belonging to the application (i.e., generated from the application) if each flow in the set includes the entirety of at least one token (i.e., a combination of flow portions extracted during the training phase) included in the signature set. In such embodiments, when classifying the new flow, potentially related flows are collected from the network traffic based on a pre-determined grouping criterion to form the flow set. Accordingly, classifying the new flow as being generated by the application is based on detecting, from each flow in a minimum percentage of the flow set, at least one signature in the signature set in its entirety. In particular, if the grouping criterion used is of high confidence that most, if not all, of the collected flows are related (i.e., generated by the same application) to the new flow, the minimum percentage may be set to a high level, such as 95%, 100%, etc. Conversely, if the employed grouping criterion is of medium or low confidence that the collected flows may or may not relate to the new flow, the minimum percentage may be set to a medium or lower level, such as 75%, 50%, etc.

In one or more embodiments, the pre-determined grouping criterion requires the flows in a flow set to be originated from the same IP address or the same set of IP addresses. In particular, this IP address or set of IP address is used by the particular application according an application specific criterion. In one or more embodiments, the pre-determined grouping criterion requires the flows in a flow set to be within a maximum time distance. For example, the time distance may be measured from the first flow in the flow set. In another example, the time distance may be measured between any two consecutive flows. In one or more embodiments, all the flows that are collected in sequence without any flow coming from a different source than the preceding flows are considered part of a flow set. In one or more embodiments, consecutive flows coming from the same IP address or the same set of IP addresses are considered part of the flow set until a flow is identified (e.g., using the per-flow identification described in Step 212 or Step 214) as belonging to a specific application. In one or more embodiments, the aforementioned seeding criterion for forming a seeded flow group of a seeding flow is used as the pre-determined grouping criterion for collecting the flow set related to the new flow. In other words, if the seeding flow A (151) shown in FIG. 1D is a new flow, the seeded flow group A (161) shown in FIG. 1E is the flow set related to the new flow.

In one or more embodiments, a set of flows extracted from the traffic are considered as belonging to the application (i.e., generated from the application) if each flow in the set includes the entirety of each and every token (i.e., a combination of flow portions extracted during the training phase) included in the signature set. In such embodiments, when classifying the new flow, related flows are collected from the network traffic based on a pre-determined grouping criterion to form the flow set. Accordingly, classifying the new flow as being generated by the application is based on detecting, from each flow in a minimum percentage of the flow set, each and every signature in the signature set in its entirety. As described above, the minimum percentage may be set according to a confidence level of whether the grouping criterion used is capable of collecting flows that are truly related (i.e., generated by the same application) to the new flow.

In one or more embodiments, the per-flow-set identification with exact matching may require not only exact matching, but also that matching flows appear in the same order in which they were identified as a signature set from the training set.

In Step 214, the pre-determined classifying criterion requires per-flow identification with similarity matching. Using this criterion, a flow is considered as belonging to the application if a similarity score between the flow and the signature set of the application is highest across a set of applications from a single application source. As noted above, the application source may be one from Google© Play Store, iTunes© Store, etc. Example applications from these application sources may include The Weather Channel©, Google+ ©, Google© Search, Pandora©, iMovie©, iPhoto©, Keynote©, iBooks©, iTunes©, TuneIn©, iHeart©. In other words, when classifying the new flow using this criterion, multiple comparison results are generated by comparing the new flow to multiple signature sets of multiple applications from the application source. Accordingly, classifying the new flow as being generated by the application is based on determining, from the multiple comparison results, that the new flow is most similar to the signature set of the application compared to any other signature set across the set of applications.

As noted above, a signature is a token, which is mathematically represented as a vector having vector element(s). The vector element is a portion of a flow extracted during the training phase. In one or more embodiments, the similarity score is determined based on pre-assigning a weight (i.e., weighting factor) to a vector element of a token in the signature set. In one or more embodiments, the weight is inversely proportional to a probability of the vector element occurring in multiple flows generated by different applications in the set of applications. In other words, if the vector element is unique to a single application, it is assigned a high weight. Conversely, if the vector element may occur in flows generated from many different applications, it is assigned a lower weight. In one or more embodiments, the similarity matching does not require that a token in the signature set of the application occurs in its entirety in the new flow. Instead, if one or more vector element of the token occurs in the new flow, a similarity score is computed based on the pre-assigned weights to these vector element(s). In one or more embodiments, the similarity score of the new flow, as compared to the signature set of the application, is a sum of the weights of all vector elements (i.e., partial tokens) from the signature set that occur in the new flow. Accordingly, determining that the new flow is most similar to the signature set of the application across the set of applications is based on the similarity score being highest among all similarity scores of the new flow as compared across the set of applications.

In Step 215, the pre-determined classifying criterion requires per-flow-set identification with similarity matching. Using this criterion, a flow is considered as belonging to the application if a similarity score between a related flow set of the flow and the signature set of the application is highest across a set of applications from a single application source. In one or more embodiments, when classifying the new flow using this criterion, related flows are collected from the network traffic based on a pre-determined grouping criterion to form the flow set. In such embodiments, classifying the new flow as being generated by the application is based on multiple comparison results that are generated by comparing the flow set to multiple signature sets of multiple applications from the application source. Accordingly, classifying the new flow as being generated by the application is based on determining, from the multiple comparison results, that the flow set is most similar to the signature set of the application compared to any other signature set across the set of applications.

In one or more embodiments, the similarity matching does not require that a token in the signature set of the application occurs in its entirety in a flow of the flow set. Instead, if one or more vector element of the token occurs in any flow in the flow set, a similarity score is computed based on the pre-assigned weights to these vector element(s). In one or more embodiments, the similarity score of the flow set, as compared to the signature set of the application, is a sum of the weights of all vector elements (i.e., partial tokens) form the signature set that occur in the flow set. In one or more embodiments, the sum of the weights is normalized based on the size of the flow set to generate a normalized flow set as the similarity score. Accordingly, determining that the flow set is most similar to the signature set of the application across the set of applications is based on the similarity score being highest among all similarity scores of the flow set as compared across the set of applications.

In one or more embodiments, the aforementioned pre-assigned weights for computing the similarity score may be alternatively defined based on the frequencies with which the vector elements of a persistent token appear in the seeded flow groups during the training phase.

An example of classifying flows using host names (i.e., a special type of token) as signatures is described below. To identify an application using this technique, the host name in an HTTP GET or POST request in the flows is checked to determine if it matches one of the host names from the signature set. If so then the application can be identified corresponding to the matching host name. In another example, the domain name can be used as a signature instead of a full host name.

As noted above, flow classification with respect to applications can be performed separately for each single flow, or based on a per-flow-set basis. For example, a set of flows is considered as generated by a given application if all the flows are directed to a host name (domain) contained in the ground truth for that application. In another example, a set of flows is considered as generated by a given application if a minimum percentage of the flows are directed to a host name (domain) contained in the ground truth for that application. In yet another example, host name (domain) matching is based on similarity (e.g., by pre-assigning weighs to the sub-domain names) rather than exact matching.

In a possible embodiment, the host name (domain) contacted is extracted from the HTTP header while in another possible embodiment it is extracted from the DNS query preceding a flow (e.g., an HTTP flow) to find out the host name used as the destination in the flow.

Although specific formats, structures, or partitions are used as examples in the foregoing description regarding the various components in the network traffic classification tool, user system, and computer network, one skilled in the art, with the benefit of this disclosure, would recognize that other formats or structures may also be used in the system, methods, and examples described without deviating from the spirit of the invention.

Figure 3:
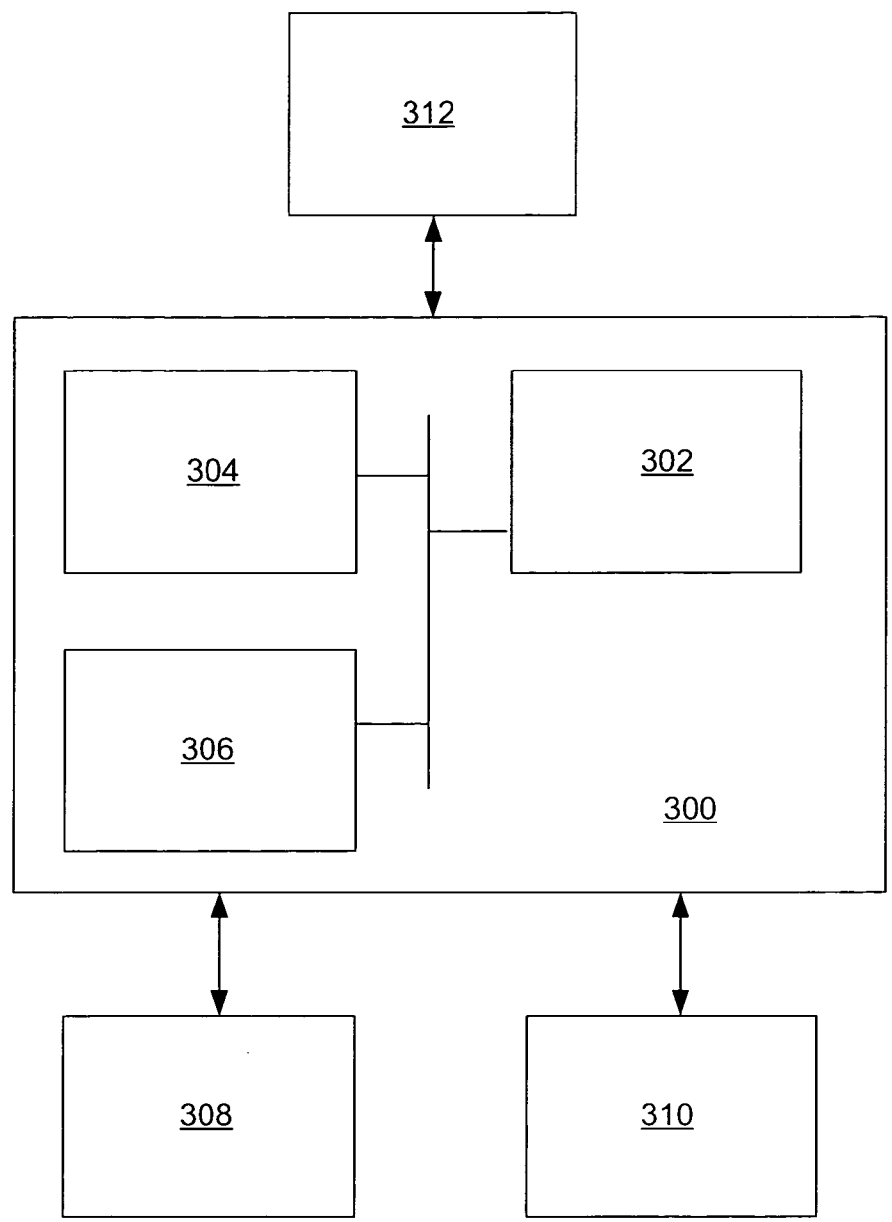
FIG. 3 shows a computer system according to aspects of the invention.

Embodiments of the invention may be implemented on virtually any type of computer regardless of the platform being used. For example, as shown in FIG. 3, a computer system (300) includes one or more processor(s) (302) (e.g., central processing unit or CPU), associated memory (304) (e.g., random document access memory (RAM), cache memory, flash memory, etc.), a storage device (306) (e.g., a hard disk, an optical drive such as a compact disk drive or digital video disk (DVD) drive, a flash memory stick, etc.), and numerous other elements and functionalities typical of today's computers (not shown). The computer (300) may also include input means, such as a keyboard (308), a mouse (310), or a microphone (not shown). Further, the computer (300) may include output means, such as a monitor (312) (e.g., a liquid crystal display (LCD), a plasma display, or cathode ray tube (CRT) monitor) for example to display various results such as the tokens, the principal components, the application space, the signatures, etc. The computer system (300) may be connected to a network (not shown) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (300) includes at least the minimal processing, input, and/or output means necessary to practice embodiments of the invention.

Further, those skilled in the art will appreciate that one or more elements of the aforementioned computer system (300) may be located at a remote location and connected to the other elements over a network. Further, embodiments of the invention may be implemented on a distributed system having a plurality of nodes, where each portion of the invention (e.g., various modules of FIG. 1A) may be located on a different node within the distributed system. In one embodiments of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for classifying network traffic in a network, comprising:
   generating, by a processor of a computer system during a training phase, a signature set, comprising:
      obtaining, from the network traffic and based on a pre-determined selection criterion, a plurality of seeding flows;
      obtaining, from the network traffic and based on a pre-determined seeding criterion, a plurality of seeded flow groups, each comprising a plurality of flows associated with at least a seeding flow of the plurality of seeding flows;
      detecting, from at least two seeded flow groups of the plurality of seeded flow groups, a persistent data pattern having a frequency of occurrence in each of the at least two seeded flow groups exceeding a pre-determined data pattern occurrence threshold; and
      including the persistent data pattern as a signature in the signature set; and
   classifying, by the processor during a classifying phase, a new flow obtained from the network traffic, comprising:
      generating a comparison result by comparing the new flow to the signature set; and
      classifying, in response to the comparison result meeting a pre-determined classifying criterion, the new flow as being generated by an application associated with the signature set.

2. The method of claim 1,
   wherein generating the signature set further comprises:
      obtaining an initial signature set of the application as a portion of the signature set,
   wherein obtaining the plurality of seeding flows comprises:
      classifying the network traffic based on the initial signature set, wherein a subset of the plurality of seeding flows are classified as being generated by the application, and wherein the initial signature set is expanded into the signature set by at least adding the persistent data pattern as the signature in the signature set.

3. The method of claim 1, wherein the plurality of seeding flows is obtained from the network traffic on a random selection basis or a periodic selection basis.

4. The method of claim 1, wherein the frequency of occurrence represents a tally of flows, where the persistent data pattern is found, in each of the at least two seeded flow groups.

5. The method of claim 1, wherein the frequency of occurrence represents a tally of the at least two seeded flow groups where the persistent data pattern is found in at least one flow.

6. The method of claim 1, further comprising:

extracting a flow portion from a flow of the plurality of flows based on at least one selected from a group consisting of a header field, a pre-determined query field, a pre-determined delimiter, and a pre-determined K-V pair, a sequence of a pre-determined number of characters, and a sequence of a pre-determined number of bytes, wherein the flow is generated by the application based on at least one selected from a group consisting of a character-based protocol and a byte-based protocol, wherein the flow is represented as a string, wherein the flow portion comprises a substring, and wherein the persistent data pattern comprises one or more substrings.

7. The method of claim 6, wherein the persistent data pattern comprises multiple substrings from multiple flow portions extracted from multiple flows.

8. The method of claim 6, wherein the network traffic is generated by the application based on HTTP protocol.

9. The method of claim 1, wherein obtaining the plurality of seeded flow groups comprises:

identifying a seeding flow of the plurality of seeding flows;

determining that a flow has a pre-determined temporal relationship with the seeding flow; and including the flow in a seeded flow group associated with the seeding flow.

10. The method of claim 9, wherein the determining comprises detecting at least one selected from a group consisting of:

the flow starting before an end of the seeding flow and ending after a beginning of the seeding flow;

the flow starting within a pre-determined time period from the beginning of the seeding flow;

the flow starting within the pre-determined time period from the end of the seeding flow;

the flow ending within the pre-determined time period from the beginning of the seeding flow; and the flow ending within the pre-determined time period from the end of the seeding flow.

11. The method of claim 9, wherein the determining comprises identifying the flow, the seeding flow, and at least one other flow as a group and detecting at least one selected from a group consisting of:

all flow pairs in the group starting before an end of each other and ending after a beginning of each other;

all flow pairs in the group starting within a pre-determined time period from the beginning of each other;

all flow pairs in the group starting within the pre-determined time period from the end of each other;

all flow pairs in the group ending within the pre-determined time period from the beginning of each other; and all flow pairs in the group ending within the pre-determined time period from the end of each other.

12. The method of claim 1, further comprising:

detect, from the new flow, at least one signature in the signature set; and receive, in response to presenting the at least one signature to a user, a user input to exclude the at least one signature for classifying the new flow as being generated by the application.

13. The method of claim 1, further comprising:

detecting, from the new flow, at least one signature in the signature set, wherein classifying the new flow as being generated by the application is based on at least the detecting.

14. The method of claim 1, further comprising:

detecting, from the new flow, all signatures of the signature set, wherein classifying the new flow as being generated by the application is based on at least the detecting.

15. The method of claim 1, further comprising:

obtaining, during the classifying phase based on a pre-determined grouping criterion, a plurality of new flows from the network traffic to form a flow set, wherein the flow set comprises the new flow; and detecting, from at least one flow in the flow set, at least one signature in the signature set, wherein classifying the new flow as being generated by the application is based on at least the detecting.

16. The method of claim 1, further comprising:

obtaining, during the classifying phase based on a pre-determined grouping criterion, a plurality of new flows from the network traffic to form a flow set, wherein the flow set comprises the new flow; and detecting, from at least one flow in the flow set, all signatures in the signature set, wherein classifying the new flow as being generated by the application is based on at least the detecting.

17. The method of claim 1, further comprising:

generating a plurality of comparison results by comparing the new flow to a plurality of signature sets of a plurality of applications, wherein the plurality of comparison results comprise the comparison result, wherein the plurality of signature sets comprise the signature set, and wherein the plurality of applications comprise the application; and determining, based on the plurality of comparison results, that the new flow is most similar to the signature set of the application compared to any other signature set in the plurality of signature sets, wherein classifying the new flow as being generated by the application is based on at least the determining.

18. The method of claim 17, further comprising:

assigning a weight to the substring, wherein the weight is inversely proportional to a probability of the substring occurring in flows generated by different applications in the plurality of applications;

detecting the substring occurring in the new flow; and computing, in response to the detecting and based at least on the weight, a similarity score of the new flow to the application, wherein determining that the new flow is most similar to the signature set of the application is based at least on the similarity score.

19. The method of claim 1, further comprising:
obtaining, during the classifying phase based on a pre-determined grouping criterion, a plurality of new flows from the network traffic to form a flow set, wherein the flow set comprises the new flow;
generating a plurality of comparison results by comparing the flow set to a plurality of signature sets of a plurality of applications, wherein the plurality of comparison results comprise the comparison result, wherein the plurality of signature sets comprise the signature set, and wherein the plurality of applications comprise the application; and
determining, based on the plurality of comparison results, that the flow set is most similar to the signature set of the application compared to any other signature set in the plurality of signature sets,
wherein classifying the new flow as being generated by the application is based on at least the determining.

20. The method of claim 19, further comprising:
assigning a weight to the vector element, wherein the weight is inversely proportional to a probability of the vector element occurring in flows generated by different applications in the plurality of applications;
detecting the vector element occurring in the new flow; and
computing, in response to the detecting and based at least on the weight, a similarity score of the new flow set to the application,
wherein determining that the new flow set is most similar to the signature set of the application is based at least on the similarity score.

21. A system for classifying network traffic in a network, comprising:
a hardware processor;
an acquisition module executing on the hardware processor and configured to obtain, during a training phase from the network traffic, a network trace comprising a plurality of flows;
a seeded flow generator executing on the hardware processor and configured to:
obtaining, from the network trace and based on a pre-determined selection criterion, a plurality of seeding flows; and
obtaining, from the network trace and based on a pre-determined seeding criterion, a plurality of seeded flow groups, each comprising a plurality of flows associated with a seeding flow of the plurality of seeding flows;
a signature generator executing on the hardware processor and configured to generate, during the training phase, a signature set by:
detecting, from at least two seeded flow groups of the plurality of seeded flow groups, a persistent data pattern having a frequency of occurrence in each of the two seeded flow groups exceeding a pre-determined data pattern occurrence threshold; and
including the persistent data pattern as a signature in the signature set; and
a classifier executing on the hardware processor and configured to classify, during a classifying phase, a new flow obtained from the network traffic based on the signature set by
generating a comparison result by comparing the new flow to the signature set of the application; and
classifying, in response to the comparison result meeting a pre-determined classifying criterion, the new flow as being generated by an application associated with the signature set.

22. The system of claim 21,
wherein generating the signature set further comprises:
obtaining an initial signature set of the application as a portion of the signature set,
wherein obtaining the plurality of seeding flows comprises:
classifying the network traffic based on the initial signature set,
wherein the plurality of seeding flows are classified as being generated by the application, and
wherein the initial signature set is expanded into the signature set by at least adding the persistent data pattern as the signature in the signature set.

23. The system of claim 21, wherein the plurality of seeding flows is obtained from the network traffic on a random selection basis or a periodic selection basis.

24. The system of claim 21,
wherein the frequency of occurrence represents a tally of flows, where the persistent data pattern is found, in each of the two seeded flow groups.

25. The system of claim 21, wherein the signature generator is further configured to:
extracting a flow portion from a flow of the plurality of flows based on at least one selected from a group consisting of a header field, a pre-determined query field, a pre-determined delimiter, and a pre-determined K-V pair,
wherein the flow is generated by the application based on at least one selected from a group consisting, of a character-based protocol and a byte-based protocol,
wherein the flow is represented as a string,
wherein the flow portion comprises a substring, and
wherein the persistent data pattern comprises one or more substrings.

26. The system of claim 25,
wherein the persistent data pattern comprises multiple substrings from multiple flow portions extracted from multiple flows.

27. The system of claim 25,
wherein the network traffic is generated by the application based on HTTP protocol.

28. The system of claim 21, wherein obtaining the plurality of seeded flow groups comprises:
identifying a seeding flow of the plurality of seeding flows;
determining that a flow has a pre-determined temporal relationship with the seeding flow; and
including the flow in a seeded flow group associated with the seeding flow.

29. The system of claim 28, wherein the determining comprises detecting at least one selected from a group consisting of:
the flow starting before an end of the seeding flow and ending after a beginning of the seeding flow;
the flow starting within a pre-determined time period from the beginning of the seeding flow;
the flow starting within the pre-determined time period from the end of the seeding flow;
the flow ending within the pre-determined time period from the beginning of the seeding flow; and
the flow ending within the pre-determined time period from the end of the seeding flow.

30. The system of claim 28, wherein the determining comprises identifying the flow, the seeding flow, and at least one other flow as a group and detecting at least one selected from a group consisting of:
all flow pairs in the group starting before an end of each other and ending after a beginning of each other;

all flow pairs in the group starting within a pre-determined time period from the beginning of each other;
all flow pairs in the group starting within the pre-determined time period from the end of each other;
all flow pairs in the group ending within the pre-determined time period from the beginning of each other; and
all flow pairs in the group ending within the pre-determined time period from the end of each other.

31. The system of claim 21, the classifier further configured to:
detect, from the new flow, at least one signature in the signature set; and
receive, in response to presenting the at least one signature to a user, a user input to exclude the at least one signature for classifying the new flow as being generated by the application.

32. The system of claim 21, the classifier further configured to:
detect, from the new flow, at least one signature in the signature set,
wherein classifying the new flow as being generated by the application is based on at least the detecting.

33. The system of claim 21, the classifier further configured to:
detect, from the new flow, all signatures of the signature set,
wherein classifying the new flow as being generated by the application is based on at least the detecting.

34. The system of claim 21, the classifier further configured to:
obtain, during the classifying phase based on a pre-determined grouping criterion, a plurality of new flows from the network traffic to form a flow set,
wherein the flow set comprises the new flow; and
detect, from at least one flow in the flow set, at least one signature in the signature set,
wherein classifying the new flow as being generated by the application is based on at least the detecting.

35. The system of claim 21, the classifier further configured to:
obtain, during the classifying phase based on a pre-determined grouping criterion, a plurality of new flows from the network traffic to form a flow set, wherein the flow set comprises the new flow; and
detect, from at least one flow in the flow set, all signatures in the signature set,
wherein classifying the new flow as being generated by the application is based on at least the detecting.

36. The system of claim 21, the classifier further configured to:
generate a plurality of comparison results by comparing the new flow to a plurality of signature sets of a plurality of applications, wherein the plurality of comparison results comprise the comparison result, wherein the plurality of signature sets comprise the signature set, and wherein the plurality of applications comprise the application; and
determine, based on the plurality of comparison results, that the new flow is most similar to the signature set of the application compared to any other signature set in the plurality of signature sets,
wherein classifying the new flow as being generated by the application is based on at least the determining.

37. The system of claim 36, the classifier further configured to:
assign a weight to the substring, wherein the weight is inversely proportional to a probability of the substring occurring in multiple flows generated by different applications in the plurality of applications;
detect the substring occurring in the new flow; and
compute, in response to the detecting and based at least on the weight, a similarity score of the new flow to the application,
wherein determining that the new flow is most similar to the signature set of the application is based at least on the similarity score.

38. The system of claim 21, the classifier further configured to:
obtain, during the classifying phase based on a pre-determined grouping criterion, a plurality of new flows from the network traffic to form a flow set, wherein the flow set comprises the new flow;
generate a plurality of comparison results by comparing the flow set to a plurality of signature sets of a plurality of applications, wherein the plurality of comparison results comprise the comparison result, wherein the plurality of signature sets comprise the signature set, and wherein the plurality of applications comprise the application; and
determine, based on the plurality of comparison results, that the flow set is most similar to the signature set of the application compared to any other signature set in the plurality of signature sets,
wherein classifying the new flow as being generated by the application is based on at least the determining.

39. The system of claim 38, the classifier further configured to:
assign a weight to the substring, wherein the weight is inversely proportional to a probability of the substring occurring in multiple flows generated by different applications in the plurality of applications;
detect the substring, occurring, in the new flow; and
compute, in response to the detecting and based at least on the weight, a similarity score of the new flow set to the application,
wherein determining, that the new flow set is most similar to the signature set of the application is based at least on the similarity score.

40. The system of claim 21,
wherein generating the comparison result comprises comparing the new flow to a subset of the signature set of the application, wherein the subset is associated with an execution state of the application, and
wherein classifying the new flow comprised determining the new flow as being generated by the application when the application traverses the execution state.

41. A non-transitory computer readable medium storing instructions for classifying network traffic in a network, the instructions, when executed by a processor of a computer, comprising functionality for:
generating, during a training phase, a signature set, comprising:
obtaining, from the network traffic and based on a pre-determined selection criterion, a plurality of seeding flows;
obtaining, from the network traffic and based on a pre-determined seeding criterion, a plurality of seeded flow groups, each comprising a plurality of flows associated with a seeding flow of the plurality of seeding flows;
detecting, from at least two seeded flow groups of the plurality of seeded flow groups, a persistent data pattern having a frequency of occurrence in each of the two seeded flow groups exceeding a pre-determined data pattern occurrence threshold; and including the persistent data pattern as a signature in the signature set; and classifying, during a classifying phase, a new flow obtained from the network traffic, comprising:

generating a comparison result by comparing the new flow to the signature set; and classifying, in response to the comparison result meeting a pre-determined classifying criterion, the new flow as being generated by an application associated with the signature set.

42. The non-transitory computer readable medium of claim 41, wherein generating the signature set further comprises:
obtaining an initial signature set of the application as a portion of the signature set, wherein obtaining the plurality of seeding flows comprises:
classifying the network traffic based on the initial signature set,
wherein the plurality of seeding flows are classified as being generated by the application, and
wherein the initial signature set is expanded into the signature set by at least adding the persistent data pattern as the signature in the signature set.

43. The non-transitory computer readable medium of claim 42, wherein the plurality of seeding flows is obtained from the network traffic on a random selection basis.

44. The non-transitory computer readable medium of claim 41,
wherein the frequency of occurrence represents a tally of flows, where the persistent data pattern is found, in each of the two seeded flow groups.

45. The non-transitory computer readable medium of claim 41, the instructions, when executed by the processor of the computer, further comprising functionality for:
extracting a flow portion from a flow of the plurality of flows based on at least one selected from a group consisting of a header field, a pre-determined query field, a pre-determined delimiter, and a pre-determined K-V pair,
wherein the flow is generated by the application based on at least one selected from a group consisting of a character-based protocol and a byte-based protocol,
wherein the flow is represented as a string,
wherein the flow portion comprises a substring, and
wherein the persistent data pattern comprises one or more substrings.

46. The non-transitory computer readable medium of claim 45,
wherein the network traffic is generated by the application based on HTTP protocol.

47. The non-transitory computer readable medium of claim 41, wherein obtaining the plurality of seeded flow groups comprises:
identifying a seeding flow of the plurality of seeding flows;
determining that a flow has a pre-determined temporal relationship with the seeding flow; and
including the flow in a seeded flow group associated with the seeding flow.

48. The non-transitory computer readable medium of claim 47, wherein the determining comprises detecting at least one selected from a group consisting of:
the flow starting before an end of the seeding flow and ending after a beginning of the seeding flow;
the flow starting within a pre-determined time period from the beginning of the seeding flow;
the flow starting within the pre-determined time period from the end of the seeding flow;
the flow ending within the pre-determined time period from the beginning of the seeding flow; and
the flow ending within the pre-determined time period from the end of the seeding flow.

49. The non-transitory computer readable medium of claim 47, wherein the determining comprises identifying the flow, the seeding flow, and at least one other flow as a group and detecting at least one selected from a group consisting of:
all flow pairs in the group starting before an end of each other and ending after a beginning of each other;
all flow pairs in the group starting within a pre-determined time period from the beginning of each other;
all flow pairs in the group starting within the pre-determined time period from the end of each other;
all flow pairs in the group ending within the pre-determined time period from the beginning of each other; and
all flow pairs in the group ending within the pre-determined time period from the end of each other.

* * * * *